(12) United States Patent
Hansen et al.

(10) Patent No.: US 7,595,037 B2
(45) Date of Patent: Sep. 29, 2009

(54) METHOD AND APPARATUS FOR HYDRATION OF A PARTICULATE OR PULVERULENT MATERIAL CONTAINING CAO, HYDRATED PRODUCT, AND USE OF HYDRATED PRODUCT

(75) Inventors: Jens Peter Hansen, Köpenhamn Ö (DK); Lars Skaarup Jensen, Vallensbaek (DK)

(73) Assignee: FLSMIDTH A/S (DK)

( * ) Notice: Subject to any disclaimer, the term of this patent is extended or adjusted under 35 U.S.C. 154(b) by 411 days.

(21) Appl. No.: 10/594,431

(22) PCT Filed: Feb. 16, 2005

(86) PCT No.: PCT/IB2005/000385

§ 371 (c)(1),
(2), (4) Date: Sep. 26, 2006

(87) PCT Pub. No.: WO2005/100247

PCT Pub. Date: Oct. 27, 2005

(65) Prior Publication Data

US 2008/0233044 A1    Sep. 25, 2008

(30) Foreign Application Priority Data

Apr. 16, 2004    (DK) ................................ 2004 00601

(51) Int. Cl.
*C01F 11/02* (2006.01)
*C01F 11/00* (2006.01)
*B01D 53/34* (2006.01)
*B01D 53/50* (2006.01)

(52) U.S. Cl. ........................ 423/640; 423/159; 423/160; 423/161; 423/164; 423/178; 423/243.08; 423/244.07; 422/162

(58) Field of Classification Search .................. 423/640, 423/159–161, 164, 178, 243.08, 244.07; 422/162
See application file for complete search history.

(56) References Cited

U.S. PATENT DOCUMENTS 1,890,202 A * 12/1932 Tinker et al. ................. 564/173

(Continued)

FOREIGN PATENT DOCUMENTS

GB    881813 A    11/1961

(Continued)

OTHER PUBLICATIONS (D4) Russian Article dated 1955, cited in the Russian Office Action mailed Nov. 26, 2008 in a corresponding application.
Russian Office Action mailed Nov. 26, 2008 in a corresponding application. The Russian Office Action discusses the relevance of each of the foreign patent documents cited herein above.

*Primary Examiner*—Jerry Lorengo
*Assistant Examiner*—Kevin M Johnson
(74) *Attorney, Agent, or Firm*—Jeffrey S. Melcher; Manelli Denison & Selter PLLC

(57) ABSTRACT

Described is a method as well as an apparatus for hydration of a particulate or pulverulent material containing CaO. The method is peculiar in that water is added in a quantity which will ensure that the partial pressure $P_{H2O}$ of the added water as a function of the temperature (° C.) is maintained within the interval defined by the formula (I), where $P_{H2O}$ is the partial pressure of water vapour in atm. and T is the temperature in ° C. Hereby is obtained that the material particles do not lump into agglomerates, and that the particles are hydrated evenly from the outside and inwards so that it is the active surface of the material particles which undergoes hydration in connection with partial hydration. This is due to the fact that the liquid water will not get into contact with the material particles since the water will appear in vapour form within the specified interval.

20 Claims, 2 Drawing Sheets

Figure 1:
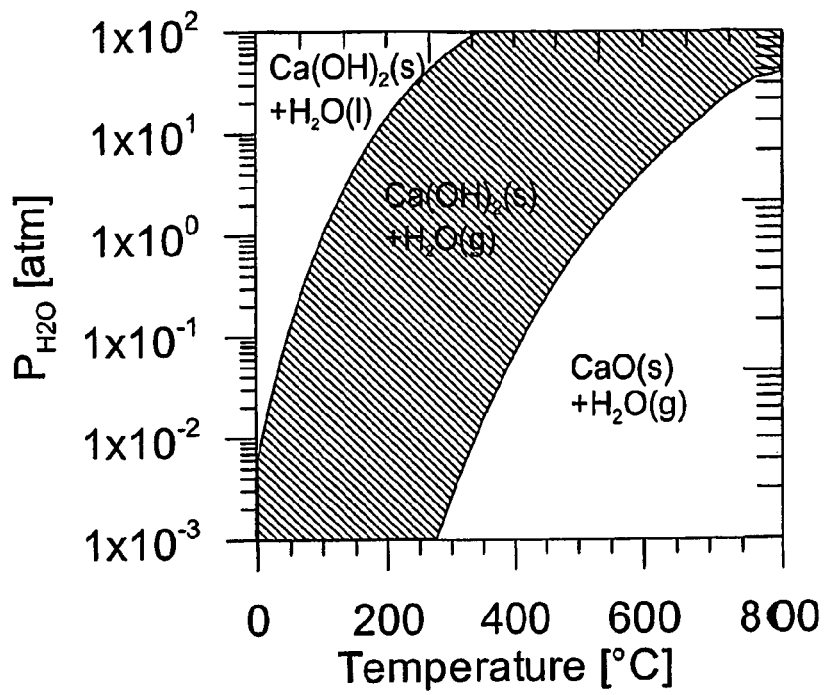

U.S. PATENT DOCUMENTS 2,309,168 A    1/1943  Corson
3,106,453 A *  10/1963 Corson .................... 423/640
5,173,279 A *  12/1992 Dumont et al. .......... 423/240 S
5,792,440 A *  8/1998  Huege ..................... 423/432
5,903,591 A *  5/1999  Brassey .................... 373/120

FOREIGN PATENT DOCUMENTS

| | | | |
|---|---|---|---|
| GB | 976085 A | 11/1964 | |
| RU | 1811514 A3 | 4/1993 | |
| RU | 2138454 C1 | 9/1999 | |
| SU | 367055 A | 1/1973 | |
| SU | 857037 A | 8/1981 | |
| SU | 1341161 A | 9/1987 | |
| WO | WO 0078435 | 12/2000 | |
| WO | WO 02096820 A1 | 12/2002 | |

* cited by examiner

METHOD AND APPARATUS FOR HYDRATION OF A PARTICULATE OR PULVERULENT MATERIAL CONTAINING CAO, HYDRATED PRODUCT, AND USE OF HYDRATED PRODUCT

The present invention relates to a method for hydration of a particulate or pulverulent material containing CaO. The hydrated product may be used for reducing the SO$_2$ discharge from a kiln plant, such as a kiln plant for manufacturing cement clinker. The invention also relates to an apparatus for carrying out the method.

A method of the aforementioned kind is known from, for example, DK/EP 1 200 176. The primary disadvantage of this known method is the slow rate of hydration which is ascribable to the fact that the hydration of the raw meal containing CaO takes place in a mixture of air and water where the partial pressure of the water vapour is at a relatively low level. In cases where it is desirable to achieve hydration degrees ranging between 80 to 100% of the CaO contained in the material, this known method will require a relatively long retention time during which the material particles and the water vapour make contact, hence necessitating a substantial reaction volume. Also known is a method in which material containing CaO is extracted from a kiln system, cooled to a temperature below 250° C. and subsequently hydrated when mixed with liquid water. The disadvantage of this method is that the material particles may have a tendency towards agglomeration, entailing need for a subsequent and expensive disagglomeration or grinding of such lumped material agglomerates into smaller single particles. A further disadvantage of this method is that the hydration of the material particles containing CaO does not always take place evenly from the outside and inwards towards the core of the particles, often occurring instead in such a way that some of the particles are completely hydrated whereas others are not hydrated at all or only to a limited extent.

It is the object of the present invention to provide a method as well as an apparatus by means of which the aforementioned disadvantages will be reduced.

This object is achieved according to the invention by means of a method of the kind mentioned in the introduction and being characterized in that water is added in a quantity which will ensure that the partial pressure $P_{H_2O}$ of the added water as a function of the temperature (° C.) is maintained within the interval defined by the formula $$6.85 - \frac{5459}{(T+273)} < \log P_{H_2O} < 5.45 - \frac{2032}{(T+273)},$$

where $P_{H_2O}$ is the partial pressure of water vapour in atm. and T is the temperature in ° C.

Hereby is obtained that the material particles do not lump into agglomerates, and that the particles are hydrated evenly from the outside and inwards so that it is the active surface of the material particles which undergoes hydration in connection with partial hydration. This is due to the fact that the liquid water will not get into contact with the material particles since the water will appear in vapour form within the specified interval.

Traditionally, Ca(OH)$_2$ is formed by a reaction between burned lime and water in liquid form, but according to this invention the reaction is achieved by means of water vapour. By suspending the particles in water vapour instead of slaking them in liquid water it will be possible to prevent agglomeration of the particles, hence avoiding a subsequent and expensive disagglomeration or grinding of these agglomerates into smaller single particles.

Ca(OH)$_2$ is formed during the hydration process. The stability of the Ca(OH)$_2$ formed during the hydration process depends primarily on the temperature and the partial pressure of the formed water vapour as illustrated in FIG. 1. The hydration process should advantageously take place in an atmosphere containing the maximum amount of water vapour. It is therefore preferred according to the invention that the material containing CaO as well as the water are introduced into an upper end of a vertical reactor, directed down through the latter subject to simultaneous vaporization and hydration, and that the hydrated product is discharged from the reactor at a lower end hereof. Because of the downwardly directed direction of movement in the reactor it is not necessary to use air as conveying medium for the material particles, and, therefore, it will be possible to create an atmosphere consisting approximately of 100 percent pure water vapour. The heat energy required for vaporization of the water is provided by means of the material.

Alternatively, the material containing CaO can be introduced into an upper end of a vertical reactor, being directed down through the latter subject to simultaneous hydration with water which is introduced at a number of locations distributed across the height of the reactor, where any surplus water in vapour form is discharged through an opening in the upper end of the reactor and where the hydrated product is discharged from the reactor from a lower end hereof.

The rate of hydration increases with increasing temperature and partial pressure of the water vapour. However, the temperature must not exceed the temperature at which Ca(OH)$_2$ becomes unstable at a given partial pressure of the water vapour. In actual practice the temperature is determined by the temperature of the material containing CaO, the amount of water being injected and by a possibly recirculated sub-stream of hydrated product which possibly may have been further cooled after leaving the reactor. It is important that this water volume is adapted so that the temperature of the material containing CaO and the partial pressure of water vapour are kept within a temperature and pressure range, respectively, where Ca(OH)$_2$ is stable, where liquid water is absent and where the hydration does not stop. According to the invention it is therefore preferred that the temperature during the hydration process is maintained at a level above 100° C., preferably above 200° C. preferably above 250° C., and that the partial pressure of the water vapour is maintained within the interval 0.01 to 10 atm., preferably within the interval 0.1 to 2 atm, most preferably within the interval 0.9 to 1.1 atm.

The hydrated product may subsequently be used for reducing the SO$_2$ content in a gas. In connection with such a process, only the outer surface of the hydrated product will get into contact with the gas containing SO$_2$ targeted for cleaning, and it is a proven fact that the SO$_2$ reduction achieved is not significantly improved when hydration of the material particles is done right through to the core as compared to what is achieved if hydration is confined to the surface of the particles. It has also been ascertained that the initial rate of hydration of the surface is relatively high, whereas the subsequent hydration of the core is a slow process because the water must be diffused from the particle surface and inwards to the core through a layer of hydrated product. According to the present invention, it is, therefore, preferred that hydration is confined to the surface of the material particles. As a consequence hereof, the degree of hydration can be reduced to 70%, preferably to less than 50%.

If hydration is confined to the surface of the material particles, it will be possible to use a smaller reactor with a relatively short retention time of the material particles. In some cases where the hydrated product is used for $SO_2$ reduction in a plant where it will subsequently be heated to a level above 800° C. and hence calcined, which, for example, is the case in a plant for manufacturing cement, there will be a waste of energy unless all of the hydrated CaO is brought into contact with $SO_2$ due to the fact that the dehydration to which it is subsequently subjected during calcination is endothermic.

The method according to the invention can be advantageously utilized for a cement manufacturing plant. A cement manufacturing plant comprises a kiln system which typically comprises a cyclone preheater, a calciner, a kiln and a clinker cooler in which the cement raw meal is preheated, calcined and burned into cement clinker which is subsequently subjected to cooling. In cases where the method according to the invention is used at such a plant, or a similar plant, it is preferred that the material containing CaO in the form of calcined raw meal is extracted from the calciner of the cement manufacturing plant. Subsequently, the hydrated product can be re-introduced into the preheater of the cement manufacturing plant immediately after the location, viewed in the direction of movement of the exhaust gases, where $SO_2$ is formed in order to absorb $SO_2$ with simultaneous formation of calcium sulphate which will be discharged from the kiln system together with the cement clinker.

The apparatus according to the invention for hydration of a particulate or pulverulent material containing CaO comprises a vertical reactor incorporating an upper end and a lower end, means at the upper end of the reactor for introducing material containing CaO and water either collectively or separately, and means at the lower end of the reactor for discharging the hydrated product.

The product provided by the method according to the invention may appropriately be used for reducing the $SO_2$ discharge from a kiln plant, for example a kiln plant for manufacturing cement clinker.

Figure 2:
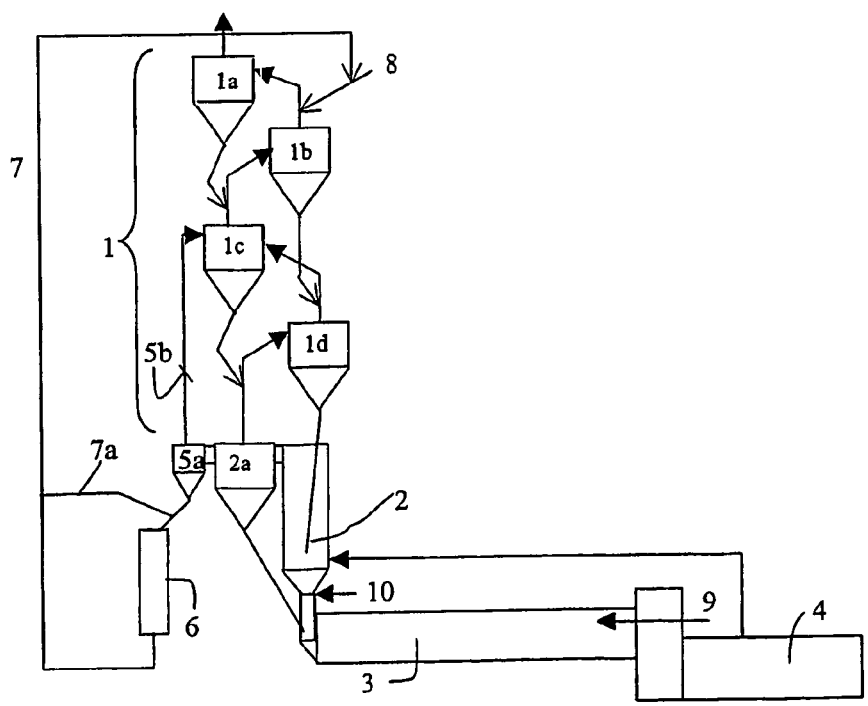
Figure 3:
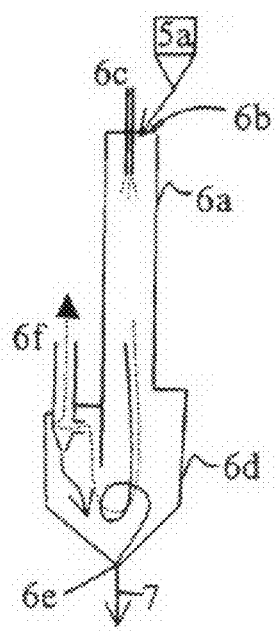
Figure 4:
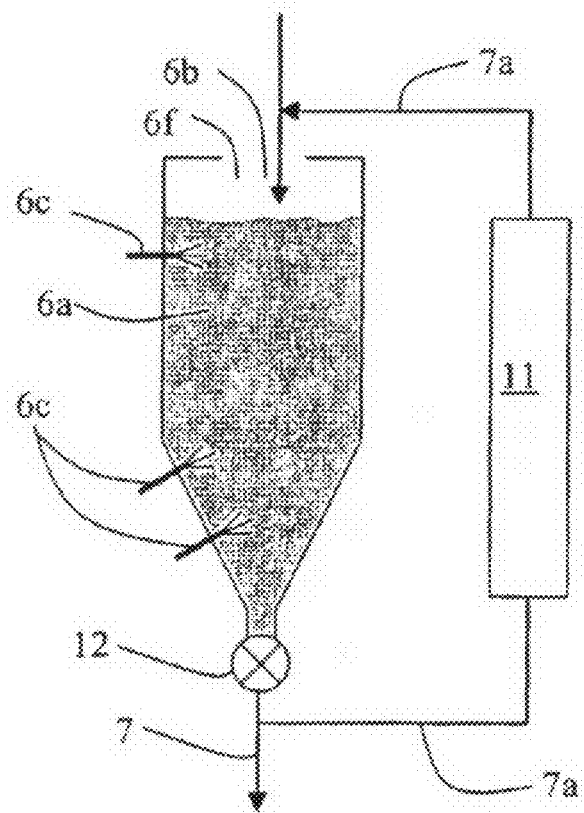

The invention will now be explained in further details with reference to the drawing, being diagrammatical, and where FIG. 1 shows a phase stability diagram for the components $H_2O$, CaO, and $Ca(OH)_2$ as a function of the temperature and the partial pressure of $H_2O(g)$, FIG. 2 shows a traditional cement manufacturing plant using the method according to the invention, FIG. 3 shows a particularly preferred embodiment of the apparatus according to the invention, and FIG. 4 shows an alternative of the apparatus according to the invention.

In FIG. 1 is seen a phase stability diagram for the components $H_2O$, CaO, og $Ca(OH)_2$. In the hatched area, $Ca(OH)_2$ is stable and water is present in vapour form. In the diagram to the right of the hatched area $Ca(OH)_2$ is unstable and will dehydrate into $CaO + H_2O$. In the diagram to the left of the hatched area, water is present in liquid form resulting in agglomeration of the material particles. When carrying out the method according to the invention, the temperature and partial pressure must thus be maintained within the hatched area which can be mathematically defined by the formula:

$$6,85 - \frac{5459}{(T+273)} < \log P_{H_2O} < 5,45 - \frac{2032}{(T+273)},$$

where $P_{H_2O}$ is the partial pressure of water vapour in atm. and T is the temperature in ° C.

In FIG. 2 is seen a cement manufacturing plant which comprises a cyclone preheater 1 with four cyclone stages 1a to 1d, a calciner 2 with separation cyclone 2a, a rotary kiln 3 and a clinker cooler 4. The plant operates in traditional manner with the raw materials being introduced at an inlet 8 in the inlet duct for the first cyclone stage 1a of the cyclone preheater and heated, calcined and burned into clinker when conveyed initially through the preheater 1, the calciner 2, and subsequently through the rotary kiln 3 in counter-flow with hot exhaust gases which are generated at a burner 9 in the rotary kiln and a burner 10 in the calciner 2, respectively. The burned clinker is subsequently cooled in the clinker cooler 4.

The method according to the invention can be advantageously utilized for such a plant.

According to the invention a quantity of the hot, calcined raw meal is extracted from the calcining stage of the plant, which raw meal has a high content of CaO. In principle, extraction of this raw meal from this stage can be done in any appropriate manner, for example by using a splitter gate fitted under the separation cyclone 2a. In the shown preferred embodiment, the calcined raw meal is extracted by means of a small cyclone 5a which is mounted parallel to the separation cyclone 2a. The quantity of material being extracted by means of the cyclone 5a can be appropriately adjusted by means of a gate 5b. The extracted calcined raw meal is then directed to a hydration unit 6 which comprises a vertical reactor 6a (see FIG. 3) with an upper inlet end and a lower outlet end. If the sub-stream of material extracted is uneven, it will be possible to install an intermediate bin (not shown) which may operated as a buffer to smoothen out the material stream which is directed to the hydration unit 6. Typically, the temperature of the extracted calcined raw meal will be around 800° C. when extracted from the calciner stage and, therefore, cooling of the raw meal may be necessary before it is introduced to intermediate bin, if any.

The very hydration of the calcined raw meal containing CaO takes place in the hydration unit 6 which is shown in further details in FIG. 3. According to the preferred embodiment of the invention, calcined raw meal and water are introduced to the reactor 6a of the hydration unit 6 at the upper end of the reactor. The raw meal may be introduced in appropriate manner via an inlet 6b whereas the water may be introduced in appropriate manner by means of one or several nozzles 6c, possibly mixed with atomizing air. In the first, upper part of the hydration unit 6 the injected water will cool the supplied raw meal and in the latter lower part it will react with CaO with simultaneous formation of $Ca(OH)_2$. In the embodiment shown the hydration unit 6 comprises a lower settling chamber 6d which is fitted in direct extension of the reactor 6a. During operation, the hydrated product will settle in the settling chamber 6d wherefrom it can be extracted via an outlet 6e.

The quantity of water which does not react with CaO, and the atomizing air, if applied, can be extracted through a duct 6f. This duct 6f may be configured with a cyclone at the bottom for separating dust suspended in the extracted air.

According to the invention the hydrated product can be used for reducing $SO_2$ in the exhaust gases leaving the cyclone preheater 1. This may appropriately be done by directing the hydrated product from the hydration unit 6 by means of appropriate means of transport 7 and mixing it with the raw meal feed which is introduced to the preheater 1 via the inlet 8. However, the hydrated product may also be introduced elsewhere, for example at a random cyclone stage or, if incorporated, in a conditioning tower (not shown).

In some cases it may be advantageous to recirculate some of the hydrated product to the hydration unit 6. This may possibly be done via the means of transport 7a which may comprise a cyclone for extracting some of the hydrated product from the means of transport 7. If, for example, the temperature of the material containing CaO which is to be hydrated exceeds that which is necessary for providing the thermal energy for the evaporation of the water volume necessary for hydration of the CaO, which, for example, may be the case if the material containing CaO is extracted from the calciner in a cement manufacturing plant in which the temperature is typically higher than 800° C., it may be advantageous to recirculate a portion of the hydrated product to the hydration unit 6. As a result, the recirculated, cooled product will reduce the temperature in the hydration unit 6, thereby reducing also the amount of water required to keep the temperature of the material containing CaO within a temperature range where $Ca(OH)_2$ is stable. The recirculation of hydrated product to the hydration unit will make it possible to adjust the temperature in the hydration unit 6 independently of the injected amount of water, and that the degree of hydration of the material is varied by the circulation factor. This will also reduce the risk of moist material sticking to and forming cakings on the reactor wall.

In FIG. 4 is seen an alternative embodiment of the apparatus for carrying out the invention.

In this embodiment calcined raw meal is introduced to the upper end of the reactor 6a of the hydration unit 6 via an inlet 6b. The water may be introduced by means of one or several nozzles 6c which are distributed across the height of the reactor, possibly mixed with atomizing air. In the first upper part of the hydration unit 6, the injected water will cool the supplied raw meal and in the last lower part it will react with CaO while Ca(OH)2 is simultaneously formed. The hydrated product can be extracted via a sluice 12. That amount of water which does not react with CaO, and, where relevant, the atomizing air, can be extracted through an opening 6f, which in the example shown is identical to the inlet 6b. A portion of the hydrated product can be recirculated via the duct 7a to the inlet 6b. If cooling of the recirculated product is required, the apparatus may incorporate a cooling unit 11.

The invention claimed is:

1. Method for hydration of a particulate or pulverulent material containing CaO, the method comprising:
   adding water to a particulate or pulverulent material containing CaO, wherein the water is added in a quantity which will ensure that the partial pressure $P_{H2O}$ of the added water as a function of the temperature (° C.) is maintained within the interval defined by the formula $$6{,}85 - \frac{5459}{(T+273)} < \log P_{H_2O} < 5{,}45 - \frac{2032}{(T+273)},$$

where $P_{H2O}$ is the partial pressure of water vapor in atm. and T is the temperature in ° C., and wherein the hydration of CaO takes place in an atmosphere containing the maximum amount of water vapor in which the temperature is maintained above 200° C. and the partial pressure of the water vapor is from 0.9 to 1.1 atm.

2. Method according to claim 1, wherein the material containing CaO as well as the water are introduced into an upper end of a vertical reactor, directed down through the latter subject to simultaneous vaporization and hydration, and that the hydrated product is discharged from the reactor at a lower end thereof.

3. Method according to claim 1, wherein the material containing CaO is introduced into an upper end of a vertical reactor, directed down through the latter subject to simultaneous hydration with water which is introduced at a number of locations distributed across the height of the reactor, where any surplus water in vapour form is discharged through an opening in the upper end of the reactor and wherein the hydrated product is discharged from the reactor from a lower end thereof.

4. Method according to claim 1, wherein the temperature during the hydration process is maintained at a level above 250° C.

5. Method according to claims 1, wherein some of the hydrated product is supplied to a hydration unit.

6. Method according to claim 1, wherein hydration is confined to the surface of the material particles.

7. Method according to claim 6, wherein the degree of hydration is less than 70%.

8. Method according to claim 6, wherein the degree of hydration is less than 50%.

9. Method according to claim 1, further comprising extracting the material containing CaO in the form of calcined raw meal from a calciner of a cement manufacturing plant.

10. Method according to claim 9, wherein the hydrated product subsequently is introduced into a preheater of the cement manufacturing plant immediately after the location, viewed in the direction of movement of the exhaust gases, where $SO_2$ is formed in order to absorb $SO_2$.

11. Method for hydrating GaO to form particles comprising $Ca(OH)_2$, the method comprising:
   adding particles comprising CaO to an upper end of a vertical reactor to form a particle flow down through the vertical reactor;
   adding water to the downward flow of particles, wherein the temperature of the particle flow where the water is added is maintained above 200° C. so that the water is converted to water vapor, the water being added in an amount to maintain a water vapor partial pressure of 0.9 to 1.1 atmosphere such that the hydration reaction is between the GaO and the water vapor to form particles comprising $Ca(OH)_2$ that are substantially free of agglomerates;
   allowing excess water vapor to escape from the upper end of the vertical reactor; and
   discharging the particles comprising $Ca(OH)_2$ from a lower end of the vertical reactor.

12. The method according to claim 11, wherein the reaction is conducted so that the hydration of outer surface of the particles comprising $Ca(HO)_2$ is greater than the hydration inside the particles.

13. The method according to claim 12, wherein the degree of hydration is less than 70%.

14. The method according to claim 12, wherein the degree of hydration is less than 50%.

15. The method according to claim 11, wherein the particles comprising CaO comprises a calcined raw meal extracted from a calciner of a cement manufacturing plant.

16. The method according to claim 11, wherein the heat energy for forming the water vapor from the water is provided by the particles comprising CaO.

17. Method for reducing the amount of $SO_2$ discharged from a kiln of a cement manufacturing plant, the method comprising:
   adding particles comprising CaO formed from a calcined raw meal extracted from a calciner of a cement manufacturing plant to an upper end of a vertical reactor to form a particle flow down through the vertical reactor;
   adding water to the downward flow of particles, wherein the temperature of the particle flow where the water is added is maintained above 200° C. so that the water is converted to water vapor, the water being added in an amount to maintain a water vapor partial pressure of 0.9 to 1.1 atmosphere such that the hydration reaction is between the CaO and the water vapor to form particles comprising $Ca(OH)_2$ that are substantially free of agglomerates, and a greater concentration of $Ca(OH)_2$ on the surface than the inside of the particles comprising $Ca(OH)_2$;

allowing excess water vapor to escape from the upper end of the vertical reactor;

discharging the particles comprising $Ca(OH)_2$ from a lower end of the vertical reactor; and supplying at least a portion of the particles comprising $Ca(OH)_2$ to a discharge from a kiln containing $SO_2$ such that the $SO_2$ reacts with the $Ca(OH)_2$ to reduce the amount of $SO_2$ discharged.

18. The method according to claim 16, wherein the degree of hydration is less than 70%.

19. The method according to claim 16, wherein the degree of hydration is less than 50%.

20. The method according to claim 16, wherein the heat energy for forming the water vapor from the water is provided by the particles comprising CaO.

* * * * *